United States Patent [19]

Ligon et al.

[11] 3,825,392
[45] July 23, 1974

[54] APPARATUS FOR FORMING PIPE COUPLING

[75] Inventors: Elmer R. Ligon; Norman D. Reed, both of Pittsburgh, Kans.

[73] Assignee: W. S. Dickey Clay Manufacturing Company, Pittsburgh, Pa.

[22] Filed: Aug. 14, 1972

[21] Appl. No.: 280,341

[52] U.S. Cl.............. 425/387 R, 249/184, 264/322, 425/392, 425/393, 425/417
[51] Int. Cl........................ B29c 17/00, B29d 23/03
[58] Field of Search........ 425/387 R, 392, 393, 395, 425/398, 400, 417; 264/320, 322; 249/184

[56] References Cited
UNITED STATES PATENTS

| | | | |
|---|---|---|---|
| 1,676,325 | 7/1928 | Doll | 425/393 |
| 3,340,714 | 9/1967 | Pohl et al. | 425/398 X |
| 3,474,999 | 10/1969 | Shupe | 249/184 |
| 3,484,900 | 12/1969 | Sands et al. | 425/393 |
| 3,553,780 | 1/1971 | Kuhlemann | 425/393 X |
| 3,557,278 | 1/1971 | Kuhlemann | 264/322 X |
| 3,677,684 | 7/1972 | Platz | 425/393 |
| 3,749,543 | 7/1973 | Stansbury | 425/393 |

FOREIGN PATENTS OR APPLICATIONS 659,448  10/1951  Great Britain...................... 249/184

*Primary Examiner*—J. Spencer Overholser
*Assistant Examiner*—Ronald J. Shore
*Attorney, Agent, or Firm*—Fishburn, Gold & Litman

[57] ABSTRACT

An apparatus and method for molding a pipe coupling from tubular blanks or members of suitable synthetic resin wherein the apparatus comprises an outer jacket mounted on a supporting frame and an inner mold member positioned within the outer jacket and having a plurality of sections each having an outer surface selectively movable toward and away from an inner surface of the outer jacket in response to operation of an extensible member. The outer jacket and each of the sections of the inner mold member have means for communicating a temperature controlling material into same. The molding method is to heat a tubular member, insert same into the molding apparatus and move the parts to form the member to form the coupling which is then cooled to harden same and removed from the mold. When the resin member is in elongate form or pipe a cutting blade is mounted on the supporting frame and engageable with the tubular portion at a position to sever a molded pipe coupling of a desired length from the pipe section.

9 Claims, 16 Drawing Figures

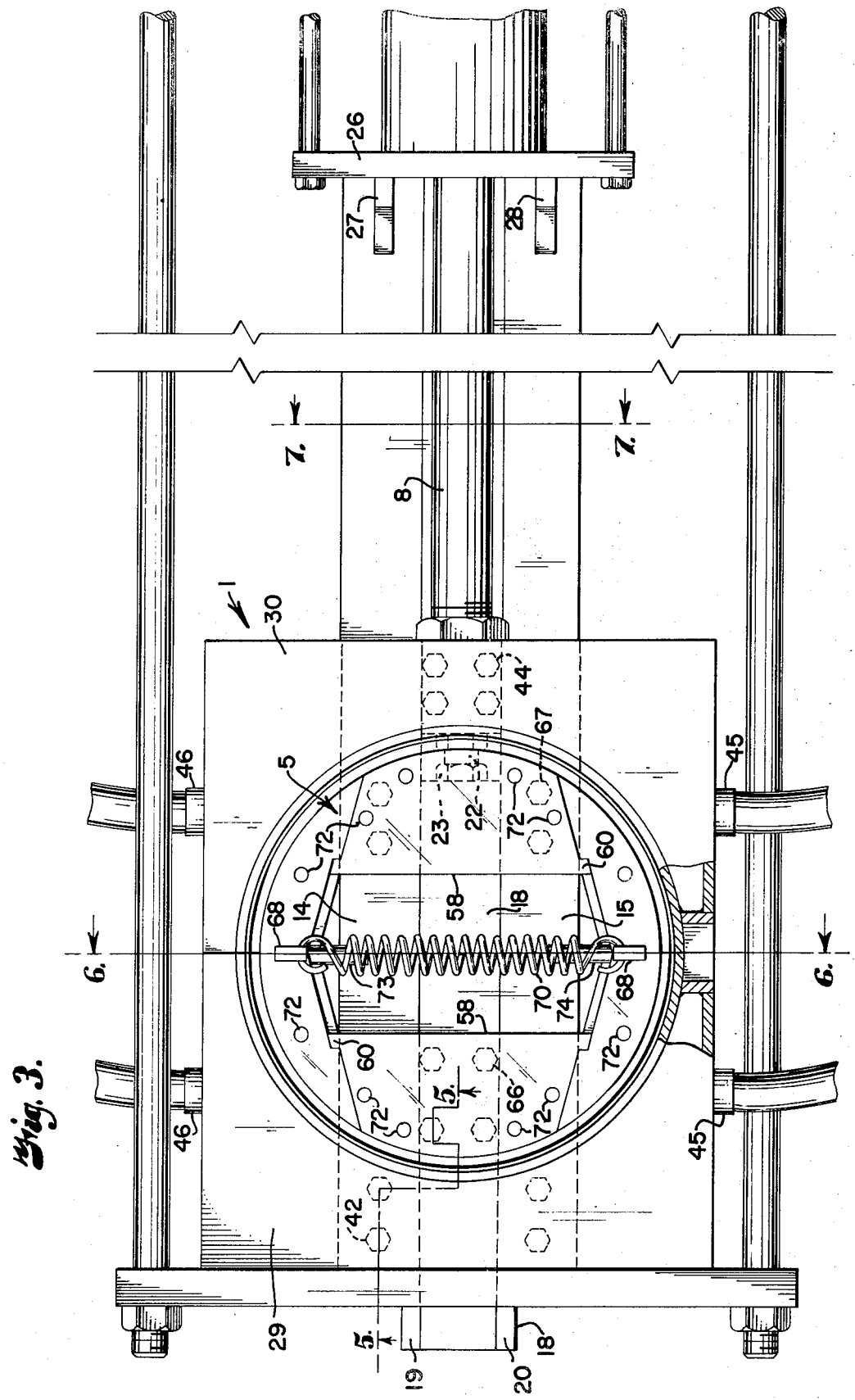

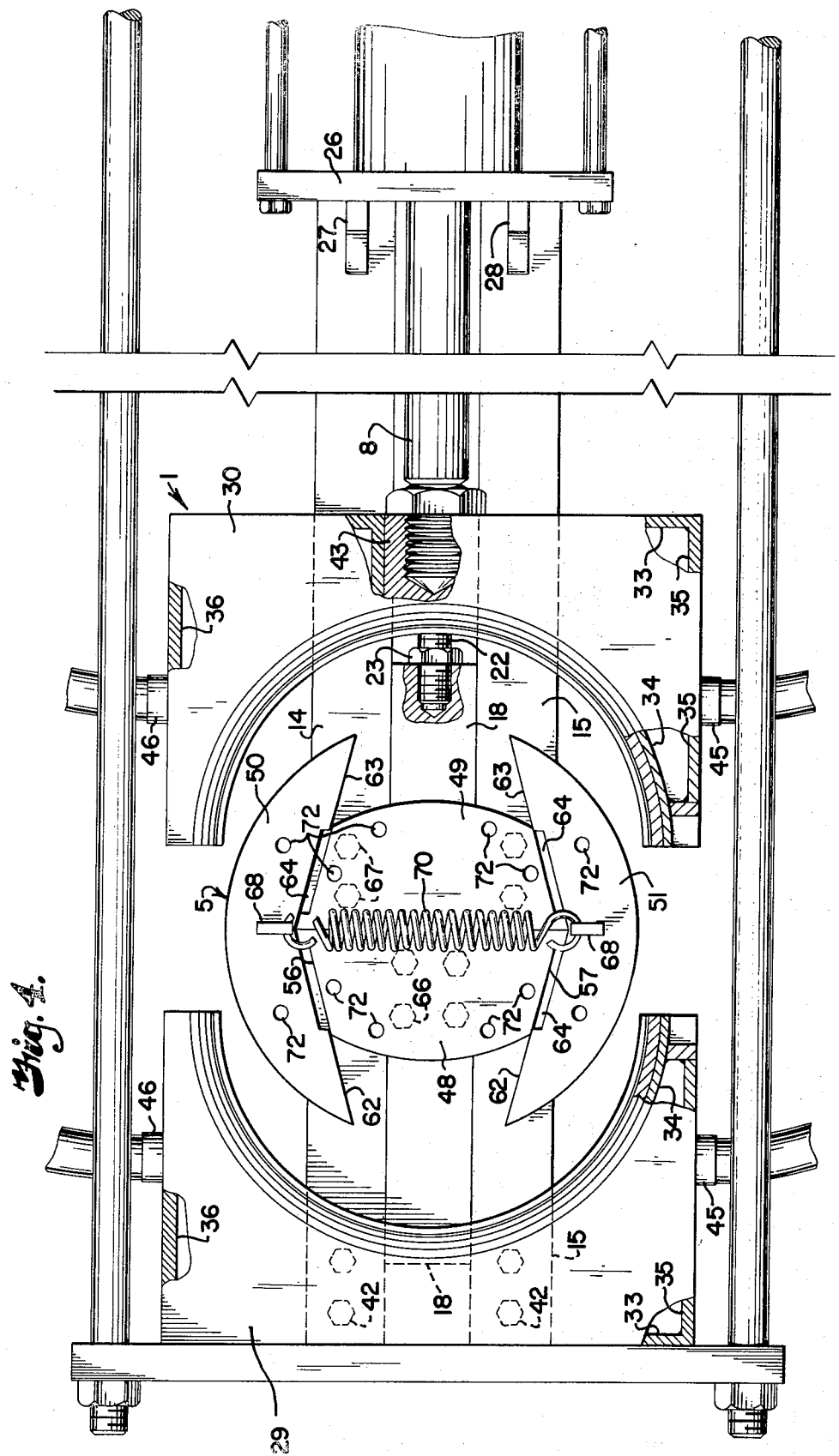

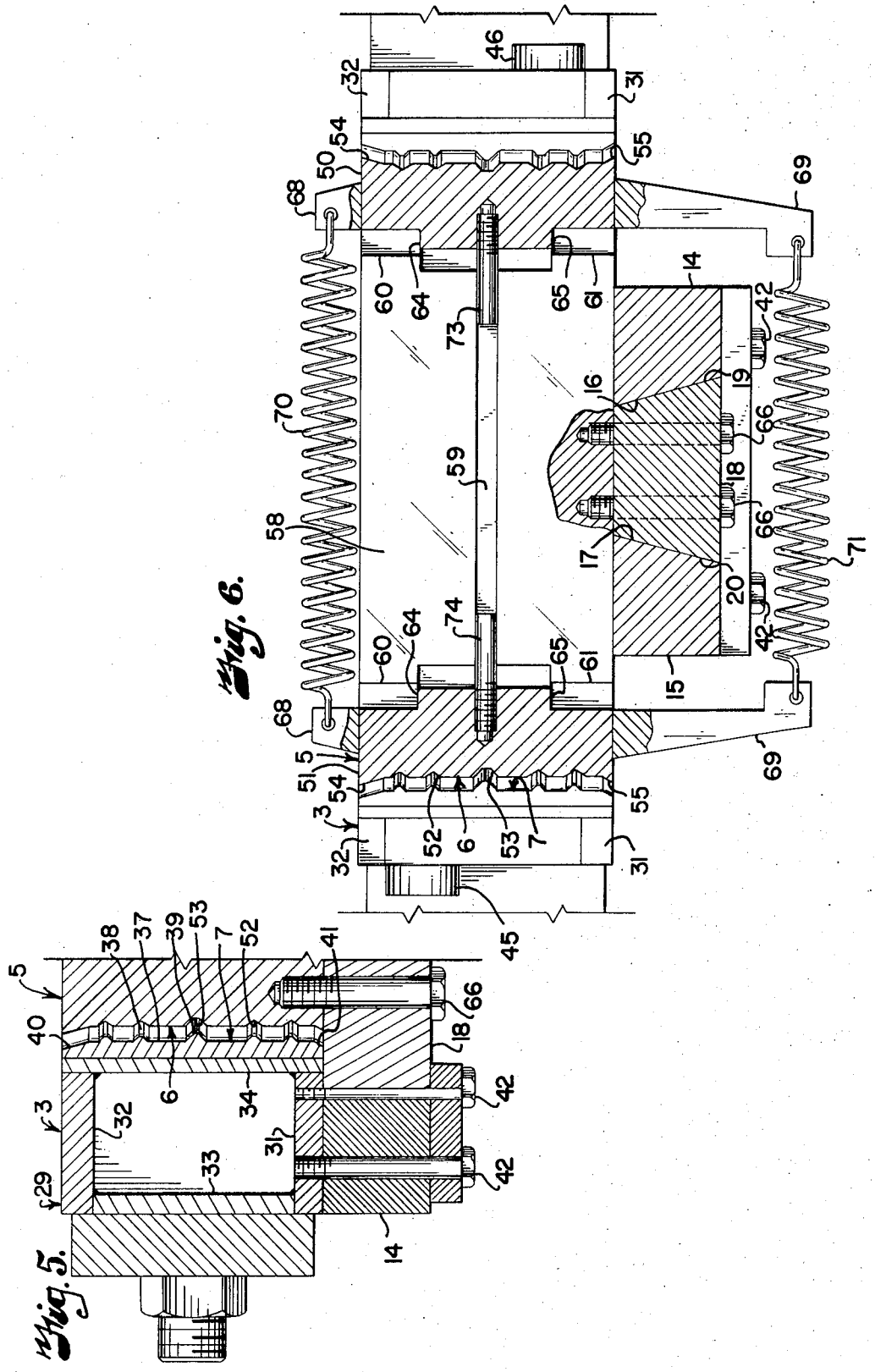

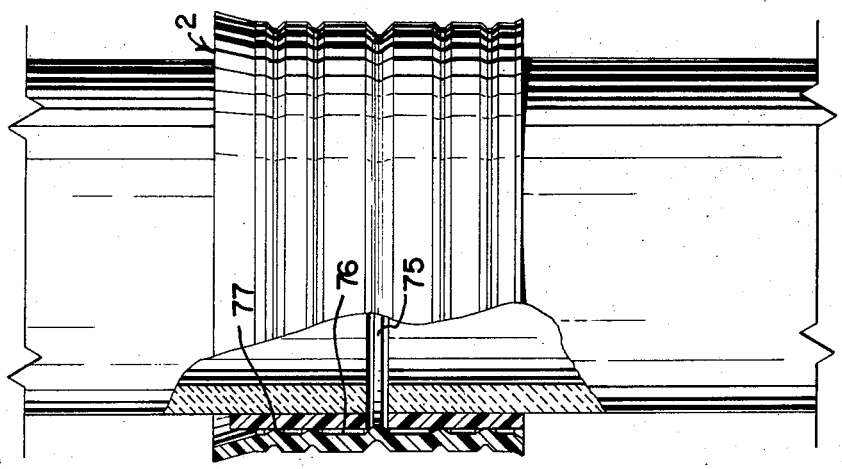
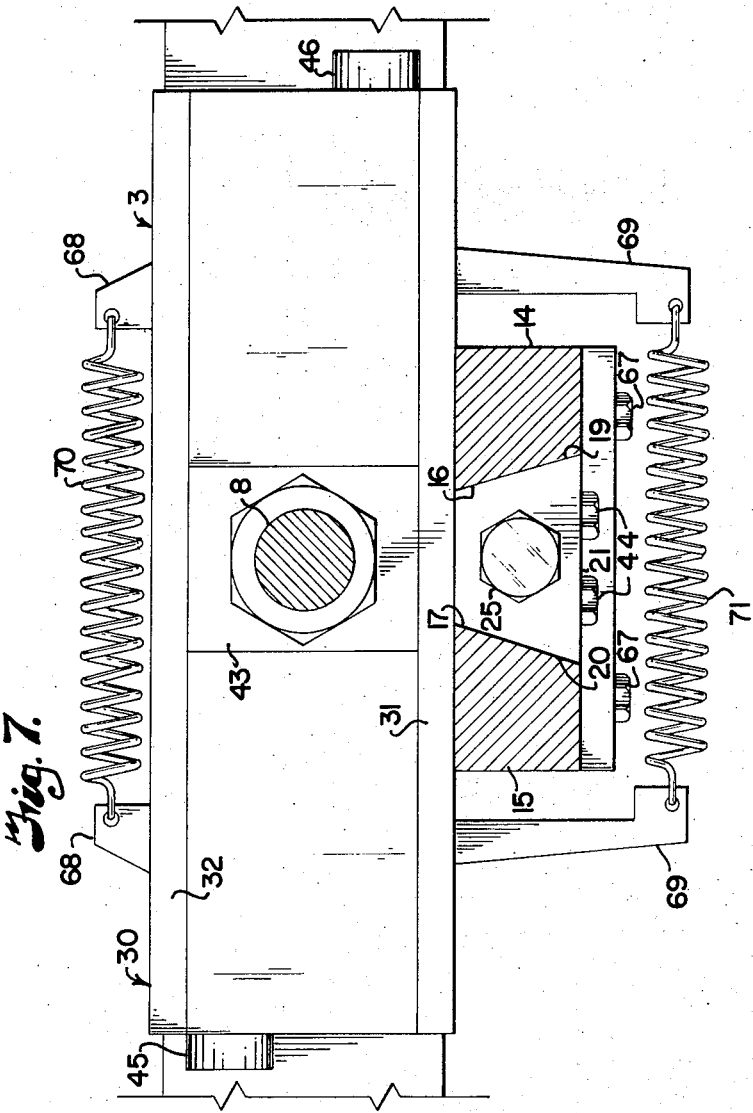

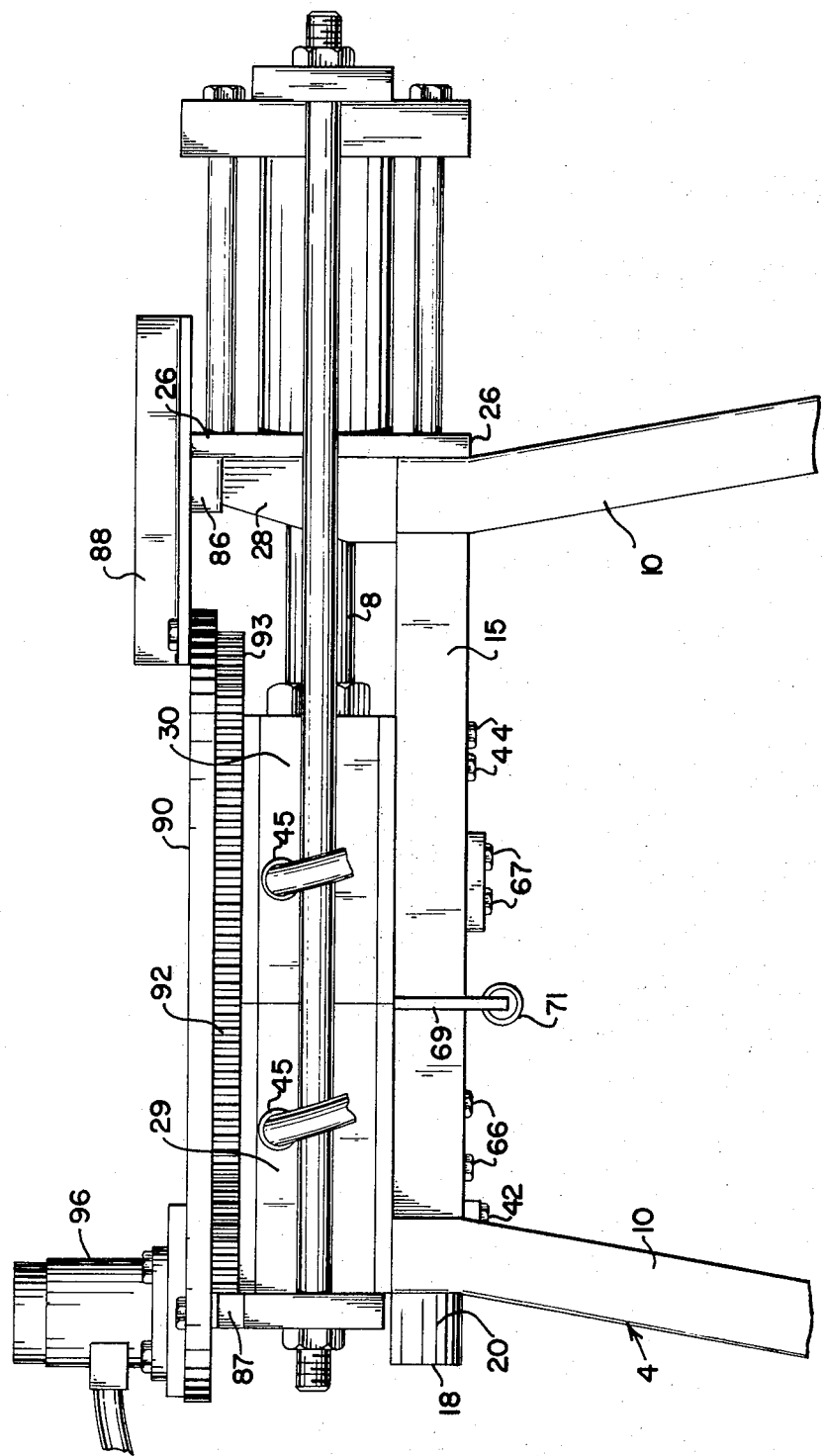

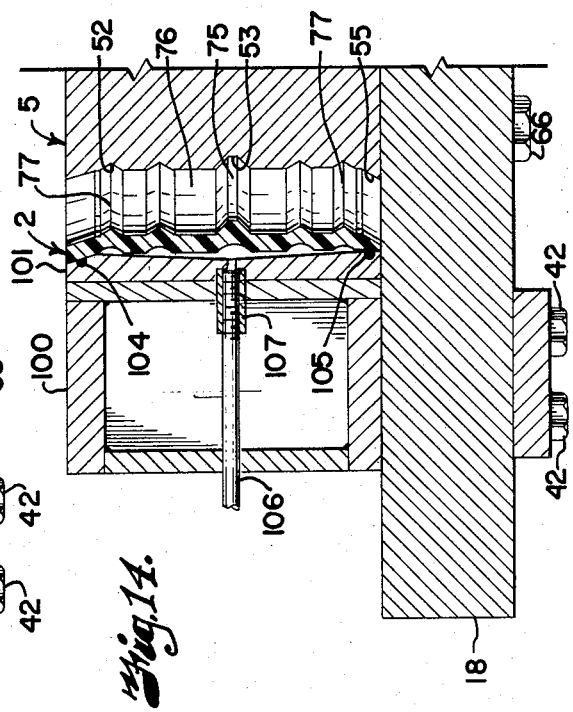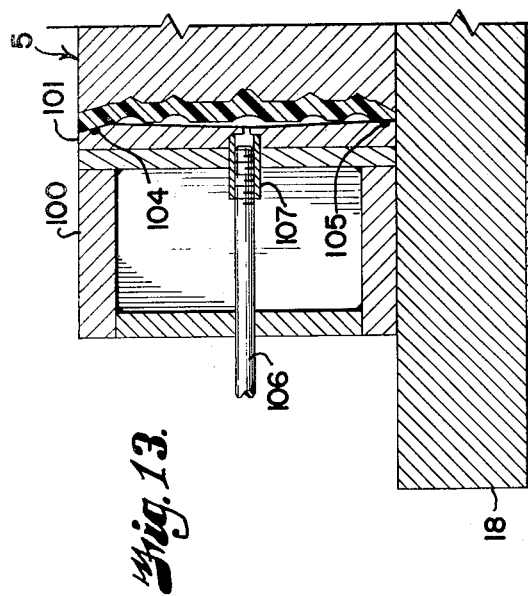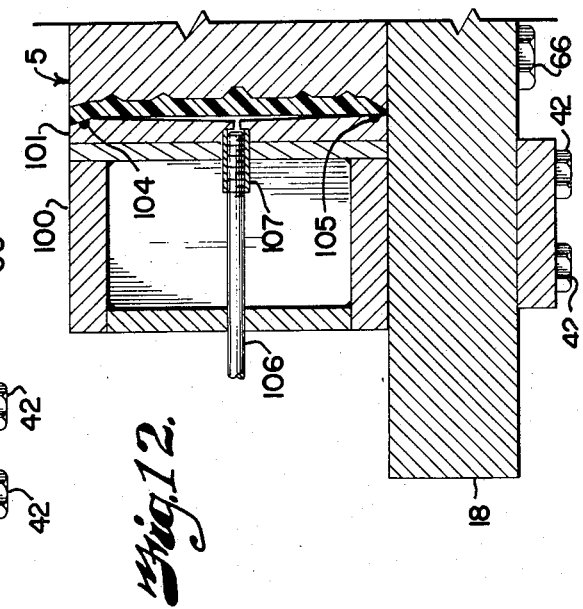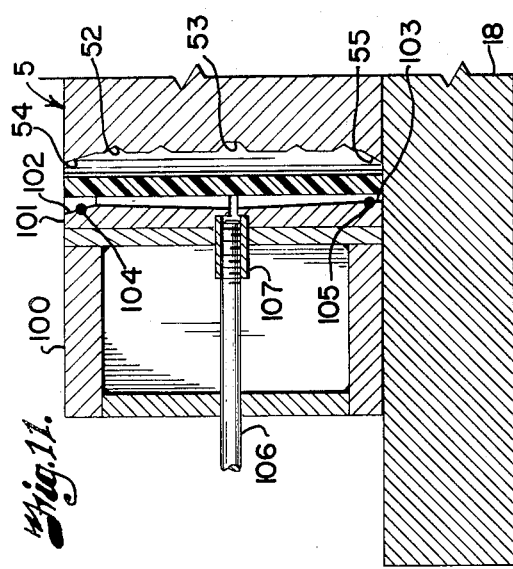

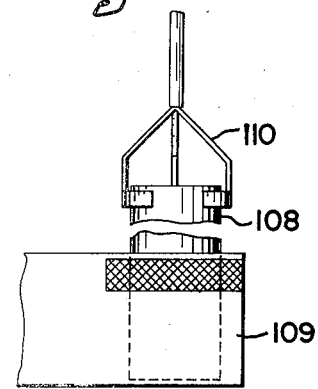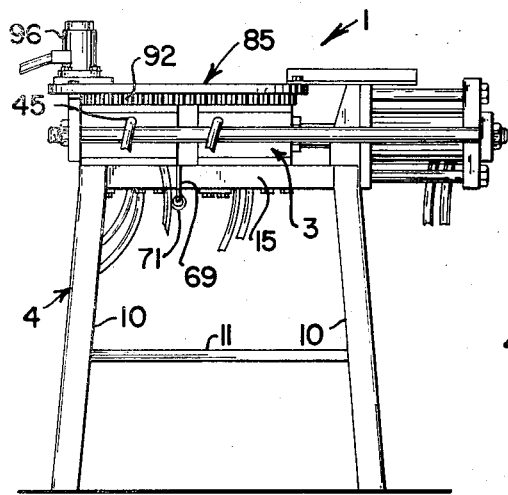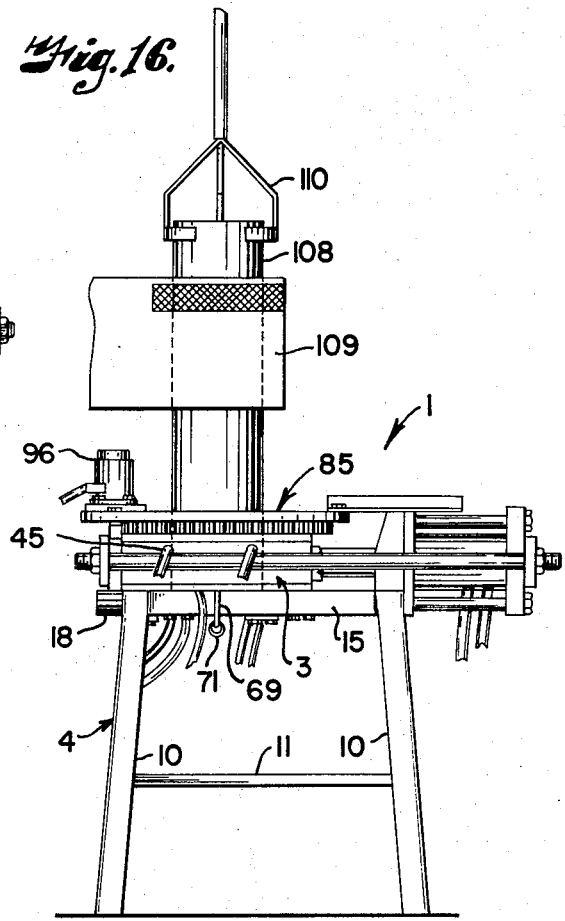

APPARATUS FOR FORMING PIPE COUPLING

The present invention relates to apparatus and method for molding a pipe coupling for use with pipe sections having plain ends and more particularly but not limited to pipe couplings for plain end ceramic pipe.

Pipe sections joined together to form a line or run of pipe for flow of fluids therethrough must be fluid tight and considerable care must be employed in forming joints between adjacent sections of pipe to avoid hoop stresses and the like which may break the pipe or a fluid seal, particularly for pipe sections having bell ends which require excavation of bell hole, care in making joints, and care in back filling of trenches having the joined pipe sections therein.

Hoop stresses developed in bell ends or portions of pipe, particularly ceramic pipe placed in underground installations, during making joints and back filling of trenches with the hoop stresses causing sufficient pipe failures to be expensive to repair and delay completion of the line of pipe.

Pipe coupling structures for joining together adjacent plain ends of two sections of pipe in substantially end-to-end abutment have been manufactured of resilient materials, such as rubber and neoprene, and having metal take-up bands to effect compression on ends of the pipe. Such pipe coupling structures generally perform satisfactorily when properly installed. However, little or no shear load resistence is provided and it has been found that there is a general reluctance of contractors and workers to tighten the take-up bands particularly within trenches.

Pipe coupling structures have been formed of substantially rigid plastic material by turning the inside diameter of the plastic pipe by milling heads, profile tools, single point tracer tools, and the like. Such turning of rigid plastic pipe has been found to be quite expensive, time consuming, and create stress areas in the coupling sleeve which weaken same.

The principal objects of the present invention are: to provide an apparatus and method for forming or molding a pipe coupling which avoids the above mentioned difficulties; to provide such an apparatus and method for forming a pipe coupling which is formed of material inert to soil materials and adapted for connecting adjacent ends of two sections of plain end pipe in substantially end-to-end abutment; to provide such an apparatus and method wherein the pipe coupling has a desired shape and is adapted to be inserted on resilient collars on end portions of sections of pipe wherein an interior surface of the pipe coupling has spaced annular portions or beads each having interferring engagement with a pipe or resilient collar thereon for forming a compression seal between the pipe coupling and resilient collars on the pipe end portions; to provide such an apparatus and method for high speed automatic molding of tubular plastic blanks or end portions of tubular pipe portions; and to provide such an apparatus and method for molding a pipe coupling which is inexpensive to manufacture and install, durable in use, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments of the present invention and illustrate various objects and features of the apparatus and method for molding a pipe coupling.

FIG. 3 is an enlarged top plan view of the pipe coupling molding apparatus shown in a closed position with portions broken away to show the outer mold member construction.

FIG. 4 is an enlarged top plan view of the pipe coupling molding apparatus shown in an open position with portions broken away to show outer mold member construction and operator connections.

FIG. 5 is a further enlarged fragmentary longitudinal sectional view taken on line 5—5, FIG. 3.

FIG. 6 is an enlarged fragmentary transverse sectional view taken on line 6—6, FIG. 3.

FIG. 7 is an enlarged fragmentary transverse sectional view taken on line 7—7, FIG. 3 and showing a slide rail and guide members.

FIG. 8 is a side elevational view of pipe sections joined together by a pipe coupling formed in the apparatus of FIGS. 1 to 7 inclusive and having portions broken away to show the shape of the wall thereof.

FIG. 9 is a side elevational view of the pipe coupling molding apparatus with a cutter apparatus.

FIG. 11 is an enlarged fragmentary sectional view through the molding apparatus with the component parts shown in an open position.

FIG. 12 is an enlarged fragmentary sectional view of the molding apparatus with the component parts shown in a closed position.

FIG. 13 is an enlarged fragmentary sectional view of the molding apparatus and showing a pipe coupling formed therein in response to gas pressure.

FIG. 14 is an enlarged fragmentary sectional view of the molding apparatus shown in an open position for removal of the formed pipe coupling.

FIG. 15 is a schematic view of the pipe coupling forming apparatus with the operating parts diagrammatically shown and illustrating the step of heating of a standard length pipe.

FIG. 16 is a schematic view showing the apparatus with the pipe lowered and extending into the forming apparatus.

Figure 2:
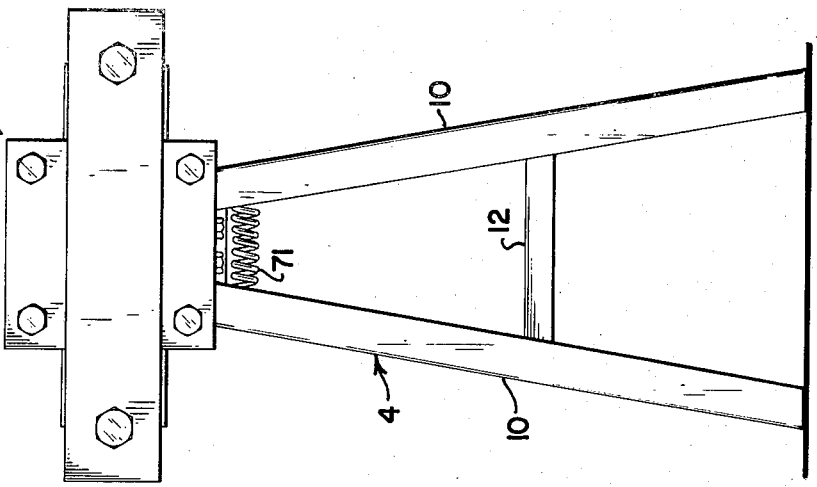
FIG. 2 is an end elevational view of the pipe coupling molding apparatus.
Figure 1:
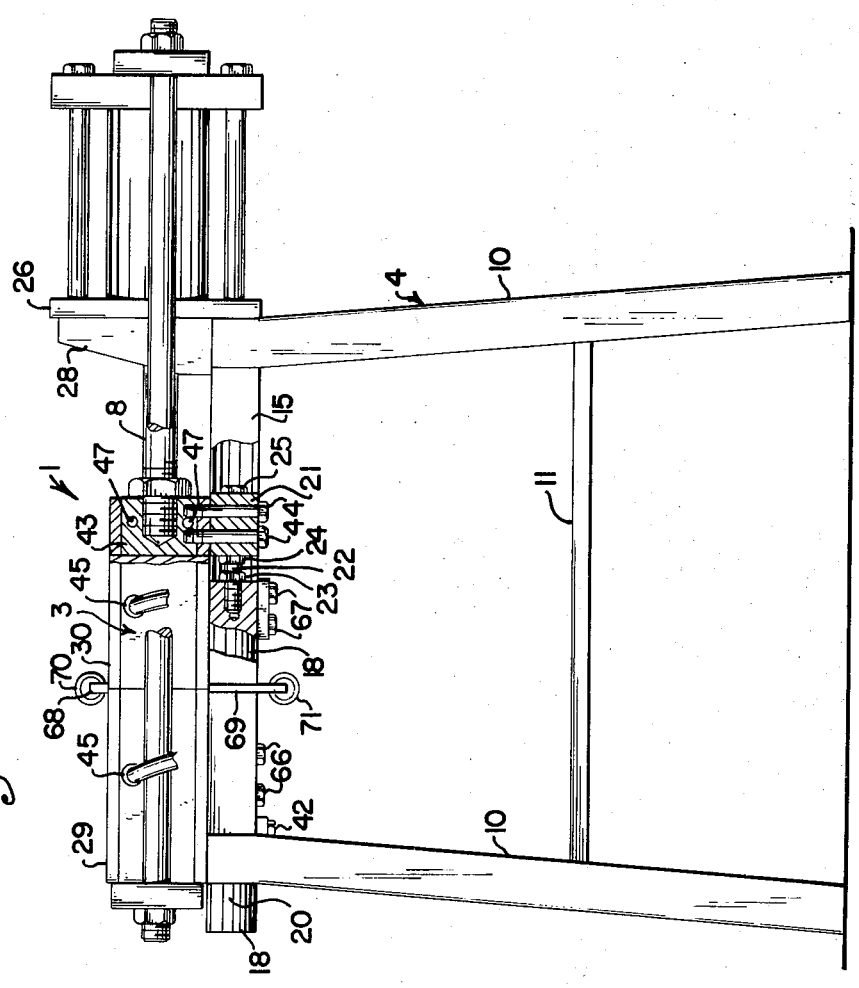
FIG. 1 is a side elevational view of a pipe coupling molding apparatus embodying features of the present invention with portions broken away to illustrate operation connections.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limited but merely as a basis for the claims and as a representative basis for teaching on skilled in the art to variously employ the present invention in virtually any appropriate detailed structure.

In the disclosed embodiment of the present invention, the reference numeral 1 generally designates an apparatus for forming or molding a pipe coupling 2 from heated tubular pipe portions or blanks (not shown) wherein the molded pipe coupling 2 is adapted for connecting adjacent ends of two sections of plain end pipe in substantially end-to-end abutment. The pipe coupling molding apparatus 1 includes an outer jacket 3 mounted on a suitable supporting frame 4 and an inner mold member 5 positioned within the outer jacket 3 and having a plurality of sections each having an outer surface 6 selectively movable toward and away from an inner surface 7 of the outer jacket 3 in response to operation of an extensible member 8. The outer jacket 3 and each of the sections of the inner mold member 5 have means for permitting communicating a cooling material into same. The pipe coupling molding apparatus 1 is adapted to receive a heated tubular insert or blank of a desired length or an end portion of a tubular pipe portion and when the end portion of tubular pipe portion is inserted into the molding apparatus, a cutting blade 9 is mounted on the supporting frame 4 and is engageable wit the tubular pipe portion at a position to sever a molded pipe coupling 2 of a desired length from the pipe portion.

The supporting frame 4 may be any suitable structure adapted to support the molding apparatus 1 in any desired location. In the illustrated structure, the supporting frame 4 has a plurality of spaced legs 10 preferably positioned at respective corners of the supporting frame 4 and suitable bracing members extending therebetween, such as longitudinal bracing members 11 and transverse bracing members 12 which provide a substantially rigid structure.

The illustrated supporting frame 4 has an upper deck supporting operative components of the molding apparatus 1 and the deck is defined by a pair of laterally spaced and longitudinally extending guide rails or members 14 and 15 extending between and suitably secured, as by welding, to respective upper ends of the legs 10. The guide members 14 and 15 have facing surfaces 16 and 17 respectively which are upwardly inclined and upwardly converging, for purpose later described.

The top or upper deck of the supporting frame 4 includes a slide rail 18 which is positioned between the guide rails or members 14 and 15 and has opposite surfaces 19 and 20 which are upwardly inclined and upwardly converging. The opposite surfaces 19 and 20 of the slide rail 18 are in sliding engagement with the facing surfaces 16 and 17 respectively of the guide members 14 and 15 whereby the guide members define a path of movement of the slide rail 18.

A spacer rail 21 corresponding in cross sections to the slide rail 18 is aligned with and spaced from one end of the slide rail 18 and the space between the spacer rail 21 and the adjacent end of the slide rail 18 is adjustable, for a purpose later described, and in the illustrated structure, an elongated threaded shaft or bolt 22 extends through a longitudinally threaded bore through the spacer rail 21 and one end of the bolt 22 is received in a threaded recess in the end of the slide rail 18. Suitable fasteners, such as nuts 23 and 24, are mounted on the shaft or bolt 22 and are tightened against respective ends of the slide rail 18 and spacer rail 21 to maintain a selected adjusted spacing therebetween. The shaft or bolt 22 has a suitable head or nut 25 engageable with an opposite end of the spacer rail 21 to thereby substantially prevent relative longitudinal movement between the spacer rail 21 and the shaft or bolt 22.

The illustrated supporting frame 4 includes an end plate 26 which suitably secured to one end of the guide members 14 and 15, as by welding, and extends upwardly therefrom for supporting the extensible member 8. Suitable gussets 27 and 28 are suitably secured to the guide members 14 and 15 respectively and to the end plate 26 to thereby provide a substantially rigid support for the extensible member 8.

The outer jacket 3 may have any desired outer or exterior shape and an interior shape which is adapted to form an outer surface of the pipe coupling 2 and in the illustrated embodiment, the outer jacket 3 is generally rectangular and has a first portion 29 and a second portion 30 which are adapted to be separated to permit insertion of a blank and removal of the formed pipe coupling 2. The illustrated first and second portions 29 and 30 each have a bottom wall 31 and a top wall 32 positioned above the bottom wall 31 and shaped side walls 33 and 34 extending between the bottom wall 31 and the top wall 32. The first and second portions 29 and 30 of the outer jacket 3 each have end walls 35 and 36 suitably connected to the bottom wall 31, top wall 32 and the side walls 34 and 35, as by welding, to define a chamber within each of the portions 29 and 30 for receiving a cooling material therein.

One of the side walls, for example, side wall 34 of the first and second portions 29 and 30, has a shape generally conforming to an exterior shape, such as generally semicylindrical of a portion of a blank or molded pipe coupling. An outer mold member 37 is a pair of semicylindrical portions each suitably secured to the respective side wall 34 and each portion has a desired surface configuration conforming to the desired shape of the molded pipe coupling 2. In the illustrated structure, each of the outer mold members 37 have a plurality of spaced projections or annular beads 38 positioned between upper and lower edges thereof and an enlarged projection or bead 39 preferably centered between the upper and lower edges of the outer mold members 37.

Upper and lower edge portions 40 and 41 respectively, of the outer mold members 37 are tappered toward respective upper and lower edges thereby defining outwardly inclined surfaces on the outer surface 7 of the outer mold members 37 whereby opposite end portions of the pipe coupling 2 will be outwardly flared.

It is desirable to effect relative movement between the first and second portions 29 and 30 of the outer jacket 3 to permit removal of a molded pipe coupling 2 having outwardly flared opposite ends. Therefore, the bottom wall 31 of the first portion 29 of the outer jacket 3 is suitably secured to the guide members 14 and 15, as by a plurality of spaced screws or bolts 42 extending through the respective guide members 14 and 15 and into the first portion 29. The other or second portion 30 of the outer jacket 3 is connected to the slide rail 18, as later described, whereby relative movement between the slide rail 18 and the guide members 14 and 15 effect relative movement between the first portion 29 and the second portion 30 of the outer jacket 3.

In the illustrated structure, a connecting member 43 is suitably secured to the second portion 30 of the outer jacket 3 and the connecting member 43 is suitably connected to the spacer rail 21, as by a plurality of bolts 44 extending through the spacer rail 21, bottom wall 31 of the second portion 30, and into the connecting member 43. One end of the extensible member 8 is suitably connected to the connecting member 43, as by being threaded and received within a threaded recess within connecting member 43.

The threaded shaft or bolt 22 is adjusted to position the second portion 30 in firm and closing engagement with the first portion 29 of the outer jacket 3 when the extensible member 8 is at one end of its stroke.

A heated tubular blank is positioned between the inner surface 7 of the outer jacket 3 and the outer surface 6 of the inner mold member 5 and after the blank is molded thereby, it is desirable to effect a "set" in the material of the blank whereby the pipe coupling 2 will retain the molded shape, therefore, a suitable cooling material or coolant is introduced into the chambers within the first and second portions 29 and 30 of the outer jacket 3.

In the illustrated structure, suitable couplings 45 are mounted in one of the end walls, for example, end wall 35, of both the first and second portions 29 and 30 for communicating coolant into the respective chambers and suitable couplings 46 are mounted in the other end wall 36 of both the first and second portions 29 and 30 to provide outlets from the respective portions of the outer jacket 3 for flow of coolant or cooling material therethrough.

It is preferable that the coolant also flow through the connecting member 43, therefore, suitable passages 47 extend through the connecting member 43 and are arranged to permit flow of coolant from the couplings 45 to the couplings 44.

The inner mold member 5 in the illustrated embodiment is formed of a plurality of sections arranged in a pair of opposed pairs and the sections are movable toward and away from the inner surface 7 of the outer jacket 3 in response to operation of the extensible member 8.

A pair of opposed sections 48 and 49 are longitudinally spaced along the guide members 14 and 15 and the slide rail 18 and define the first pair of sections of the inner mold member 5. A pair of sections 50 and 51 are in sliding engagement with the sections 48 and 49 and are laterally spaced from the slide rail 18 and thereby define the second pair of sections of the inner mold member 5.

The sections 48 to 51 inclusive each have respective outer surfaces defining a portion of the outer surface 6 of the inner mold member 5 and each have a plurality of spaced annular recesses 52 therein which are substantially aligned with the projections or annular beads 38 on the inner surface 7 of the respective outer mold members 37. The outer surface 6 of the sections 48 to 51 inclusive each have an enlarged recess 53 therein which is alignable with the enlarged bead 39 on the inner surface 7 of the respective outer mold members 37 whereby pressure exerted on the insert or blank will effect flow of the material of the blank into the annular recesses 52 and the enlarged recess 53 thereby forming a plurality of annular beads and one enlarged annular bead on an interior surface of the pipe coupling 2. The outer surface 5 of the sections 48 to 51 inclusive have upper edge portions 54 and lower edge portions 55 inclined outwardly and corresponding to the upper edge portion 40 and lower edge portion 41 respectively of the outer mold member 37 whereby the interior surface of opposite ends of the molded pipe coupling 2 are each outwardly flared.

The first pair of sections 48 and 49 each have a pair of opposite sides 56 and 57 intercepting the respective outer surface 6 thereof and diverging therefrom. The sections 48 and 49 each have a rear side 58 positioned generally opposite the outer surface 6 thereof and extending between edges of the opposite sides 56 and 57. The rear side 58 of the sections 48 and 49 each has a groove or recess 59 therein, for a purpose later described.

The first pair of sections 48 and 49 of the inner mold member 5 each have upper and lower ears 60 and 61 respectively extending outwardly from each of the opposite sides 56 and 57. The upper and lower ears 60 and 61 are each positioned adjacent the rear side 58 of the respective sections 48 and 49.

The sections 50 and 51 of the second pair of sections each has a pair of rear surfaces 62 and 63 each in sliding engagement with a respective one of the opposite sides 56 and 57 of a respective one of the sections 48 and 49 of the first pair of sections. The rear surfaces 62 and 63 on each of the sections 50 and 51 extend from the outer surface 6 and converge at the center of the respective section whereby movement of the sections 48 and 49 toward the outer mold members 37 effects movement of the sections 50 and 51 toward the outer mold members.

The rear surfaces 62 and 63 of each of the sections 50 and 51 each have upper and lower recesses 64 and 65 respectively which are adapted to receive the upper and lower ears 60 and 61 respectively of the sections 48 and 49. The upper and lower recesses 64 and 65 each have ends which are engaged by respective faces of the ears 60 and 61 respectively to limit outward movement of the sections 48 to 51 inclusive and to effect precise alignment of the respective outer surfaces 6 thereof.

In the illustrated embodiment, one of the sections 48 and 49 of the first pair of sections is suitably connected to the slide rail 21 and the other is connected to the guide members 14 and 15, for example, the section 48 adjacent the first portion 29 is suitably secured to the slide rail 18, as by a plurality of screws or bolts 66 extending through the slide rail 18 and into the section 48 whereby the section 48 is movable relative to the first portion 29 of the outer jacket 3. The other section 49 is suitably secured to the guide rails 14 and 15, as by a plurality of screws or bolts 67 extending through the respective guide rails 14 and 15 and into the section 49 whereby the second portion 30 of the outer jacket 3 is movable relative to the section 49 of the first pair of sections of the inner mold member 5.

It is desirable to effect movement of the sections 50 and 51 toward each other when the sections 48 and 49 are moved toward each other to increase the spacing between the inner surface 7 of the outer jacket 3 and the outer surface 6 of the inner mold member 5. Therefore, the sections 50 and 51 each have upper and lower brackets 68 and 69 respectively, centrally positioned and aligned in opposed pairs and adapted to have respective opposite ends of upper and lower springs 70 and 71 connected to and extending therebetween.

It is desirable to limit movement of the sections 48 and 49 toward each other, therefore, suitable projecting members 73 and 74 are mounted on the sections 50 and 51 respectively and extend radially therefrom. The projecting members 73 and 74 are centered vertically of the respective sections 50 and 51 and are positioned at the point of intersection of the rear surfaces thereof whereby the projecting members 73 and 74 are received within the groove or recess 59 in each of the sections 48 and 49 thereby limiting movement of said sections toward each other.

It is also desirable that the sections of the inner mold member 5 be cooled after engagement with the heated tubular blank, therefore, suitable cooling ports 72 extend through the sections 48 to 51 inclusive. Selected ports 72 are connected by passages extending between their lower ends and adjacent the lower surface of the respective sections to provide a greater cooling effect adjacent the outer surface 6 of the inner mold member 5.

In using a molding apparatus constructed as illustrated and described, the outer surface 6 of the sections of the inner mold member 5 are positioned in a selected spaced relation with the inner surface 7 of the outer jacket 3. A tubular blank or form is heated and then inserted between the outer jacket 3 and the inner mold member 5 to be in surrounding relation with the inner mold member 5. The extensible member 8 is operated to move the second portion 30 into engagement with the first portion 29 of the outer jacket 3 thereby closing same and to move the sections 48 to 51 inclusive to a position such that the outer jacket and the inner mold member cooperate to apply pressure to the tubular blank to effect a desired form for the blank. The outer jacket 3 and inner mold member 5 are then cooled by application of a cooling material or coolant into the couplings 45 and the cooling ports 72 thereby cooling the formed tubular blank to effect a set of the desired shape of the pipe coupling 2. The inner mold member 5 is then retracted or moved away from the outer jacket 3 thereby opening the mold and permitting the formed pipe coupling 2 to be removed from the molding apparatus 1.

FIG. 8 illustrates the molded pipe coupling 2 formed in the molding apparatus 1. A rib 75 extends radially inwardly from an interior surface 76 of the pipe coupling 2 intermediate opposite ends thereof to define sleeve portions for receiving respective end portions of pipe sections. The rib 75 is formed in the enlarged recess 53 and is sized and positioned to be engaged by respective adjacent or facing ends of the pipe sections thereby connecting same in substantially end-to-end abutment. The sleeve portions of the pipe coupling 2 each have at least one and preferably a plurality of longitudinally spaced circumferential annular portions or beads 77 each extending radially inwardly from the interior surface 76 of the respective sleeve portions of the pipe coupling 2. The spaced beads 77 are formed in respective annular recesses 52 and are positioned between the rib 75 and the respective opposite ends of the pipe coupling 2 and are each sized and positioned to effect a plurality of continuous seals around each of the pipe sections received therein, as by radially inwardly deforming respective resilient collars on the end portions of the respective pipe sections.

The pipe coupling 2 is preferably formed of a substantially rigid material having sufficient flexibility to permit nominal angular movement of the joined pipe sections transverse to the longitudinal axis of the adjacent pipe section and bending of the pipe coupling 2. The material of the pipe coupling 2 preferably is adapted to substantially retain its shape when heated to a temperature in the range of three hundred degrees Fahrenheit to three hundred thirty degrees Fahrenheit (300°F. to 330°F.). A desirable modulus of elasticity of the molded pipe coupling 2 is in the range of 50,000 to 2,000,000 pounds per square inch and a desired tensile strength is in the range of 3,000 to 8,000 pounds per square inch. Therefore, the pipe coupling 2 is formed of a suitable thermoplastic synthetic resinous material, such as polypropylene, polystyrene, polyvinyl chloride, or acrylonitrile-butadiene-styrene (commonly referred to as ABS). Polyvinyl chloride has been found to provide the desired rigidity combined with sufficient tensile strength and flexibility to support the pipe sections and permit relative movement between the pipe sections and the pipe coupling 2 all without exceeding the strength of said pipe coupling.

Figure 10:
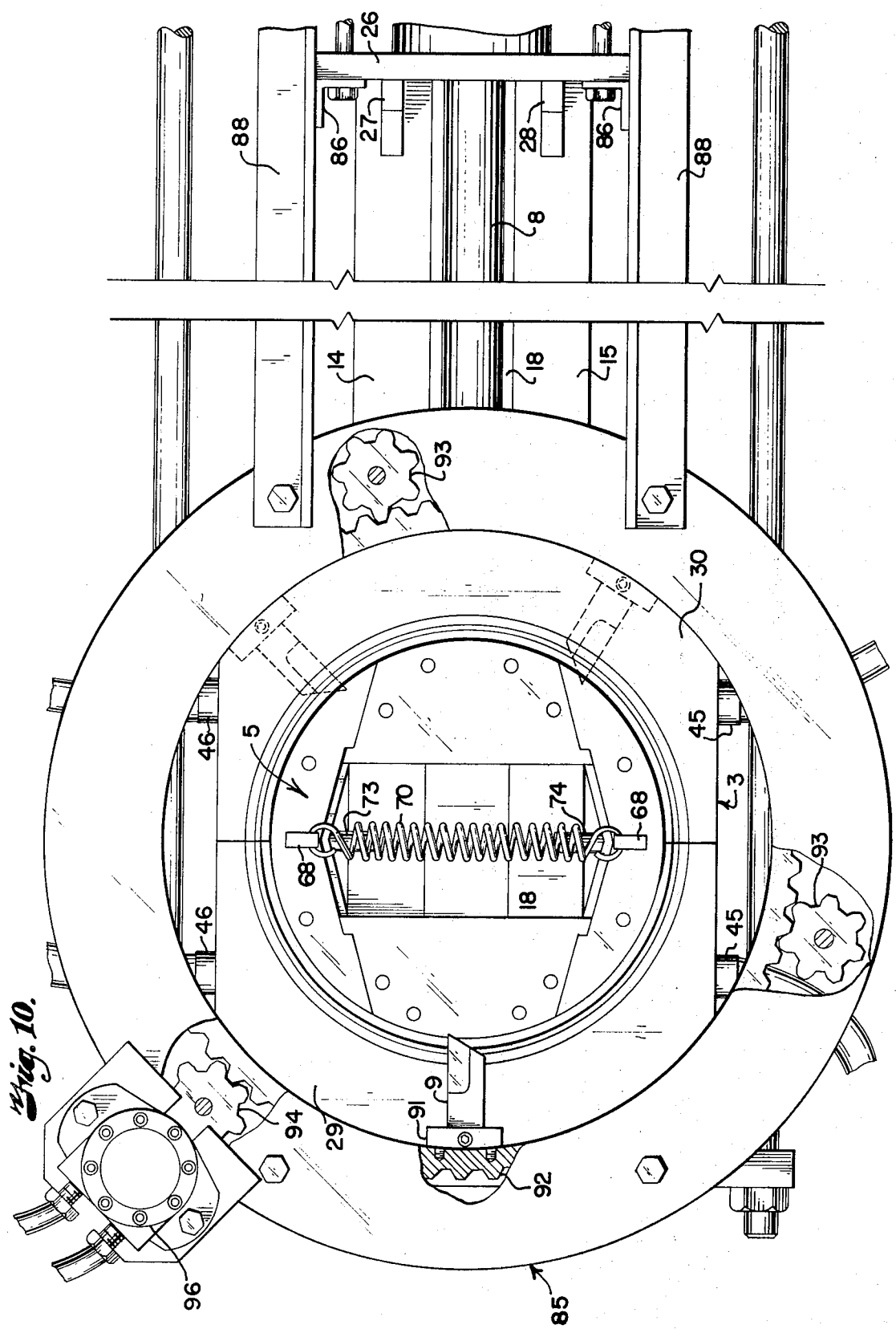
FIG. 10 is an enlarged top plan view of the molding apparatus and showing a cutting blade with alternate positions thereof shown in broken lines and with portions broken away to show the cutter mounting.

FIGS. 9 and 10 illustrate an other feature of the invention wherein the molding apparatus illustrated in FIGS. 1 to 7 inclusive is adapted to receive heated tubular blanks precut to a desired length for forming pipe coupling 2. The molding apparatus illustrated in FIGS. 9 and 10 is adapted to receive a standard length pipe (not shown) having an end portion thereof heated to a desired temperature, such as in the range of 300°F. to 330°F., with the heated end being inserted into the space between the inner surface 7 of the outer jacket 3 and the outer surface 6 of the inner mold member 5. The molding apparatus illustrated in FIGS. 9 and 10 is adapted to cut or separate the molded pipe coupling 2 from the remainder of the tubular pipe thereby substantially increasing the speed of operation of the molding apparatus 1.

In the illustrated structure, cutting means 85 are positioned above the outer jacket 3 and the inner mold member 5 and supported on the supporting frame 4 wherein suitable upright members 86 are connected to the end plate 26 and extend upwardly therefrom. Support members 87 are suitably connected to the supporting frame 4 adjacent the first portion 29 of the other jacket 3 and extend upwardly above the outer jacket 3. Suitable top support members 88 are secured to the upright members 86 and extend generally horizontally therefrom and above the molding apparatus 1. An annular ring 90 is positioned above the molding apparatus 1 and is suitably secured to the support members 87 and to the top support members 88 for supporting the cutting means 85 which are operative to cut a pipe portion (not shown) adjacent exposed upper faces of the outer jacket 3 and the inner mold member 5 to thereby separate or sever a molded pipe coupling 2 which has been molded between the inner surface 7 and the outer surface 6 from the pipe portion extending upwardly from the molding apparatus 1.

In the illustrated structure, the upper surfaces of the top walls 32 of the first and second portions 29 and 30 of the outer jacket 3 are substantially coplanar and the sections 48 to 51 inclusive of the inner mold member 5 each have upper surfaces which are substantially coplanar one with the other and with the upper surfaces of the top walls 32 of the outer jacket 3.

The cutting means 85 is illustrated as including a blade support 91 having the cutting blade 9 thereon and extending radially inwardly from an inner surface of a ring gear 92. The ring gear 92 is in operative engagement with a pair of stabilizing gears 93 and a pinion gear 94. The stabilizing gears 93 and preferably the pinion gear 94 are rotatably supported on the annular ring 90, as by suitable spindles depending therefrom. The ring gear 92 is preferably in sliding engagement with an upper surface of the outer jacket 3 whereby the cutting blade 9 is positioned adjacent the respective upper surfaces of the outer jacket 3 and the inner mold member 5.

Driving or moving the cutting blade 9 and the ring gear 92 is effected by a suitable orbit motor 96 which is preferably driven hydraulically. The orbit motor 96 is operative to rotate a shaft having a suitable drive gear (not shown) thereon which is in operative engagement with the pinion gear 94 whereby operation of the orbit motor 96 effects rotation of the ring gear 92 and the blade 9 thereon.

In using a molding apparatus 1 having the cutting means 85 as illustrated in FIGS. 9 and 10, the knife or blade 9 is positioned above the first portion 29 of the outer jacket 3 and substantially longitudinally aligned with the slide rail 18, as shown in solid lines in FIG. 9, thereby being positioned in line with the motion of the opening and closing of the outer jacket 3 and inner mold member 5. The molding apparatus is then opened whereby the inner mold member sections have a smaller average diameter than the inside diameter of the tubular pipe portion and the inner diameter of the outer jacket 3 is larger than the outer diameter of the tubular pipe portion. The knife or blade 9 has a radial dimension less than the distance moved by the second portion 30 of the outer jacket 3 whereby the heated end portion of the tubular pipe portion may be inserted into the molding apparatus 1 without engagement with the blade 9. When the mold is closed the blade or knife 9 punctures and passes through the heated material of the tubular pipe portion and then after the forming of the end portion by the closing of the mold, the orbit motor 96 is activated to rotate the ring gear 92 and the blade 9 adjacent or flush with the upper surface of the outer jacket portions and the sections of the inner mold member. One revolution of the blade 9 separates the tubular pipe portion from the newly formed pipe collar 2. Cooling material is introduced into the molding apparatus, as previously described, and the molding apparatus is opened to permit the newly formed pipe coupling 2 to be removed therefrom.

FIGS. 11 to 14 inclusive illustrate an additional feature of the molding apparatus wherein an outer jacket 100 is a one piece unit and is not separated by the extensible member 8. An outer mold member 101 is mounted on the outer jacket 100 and defines an inner surface of the outer jacket 100. The outer mold member 101 has upper and lower edge portions 102 and 103 respectively, each having a recess therein adapted to receive a suitable annular seal member, such as O-rings 104 and 105 respectively.

Closing movement of the inner mold member 5 is effective to move respective portions of a heated tubular blank into engagement with the upper and lower O-rings 104 and 105 thereby effecting a substantially fluid tight seal with the respective annular portions of the tubular blank which are moved into engagement with the upper and lower edge portions 102 and 103 of the outer mold member 101 by the upper and lower edge portions 54 and 55 of the inner mold member 5 during said closing movement of the inner mold member 5. The outer mold member 101 encloses and surrounds the exterior surface of the heated tubular blank between the annular upper and lower portions and is spaced therefrom.

It has been found that high velocity fluid pressure is effective to cause the material in the wall of the tubular blank to flow, therefore, gas under pressure is directed into a space between the inner surface of the outer mold member 101 and an outer or exterior surface of the heated tubular blank which is effective to move respective portions of the tubular blank into the recesses 52 and 53 in the outer surface 6 of the sections 48 to 51 inclusive of the inner mold member 5. In the illustrated structure, respective upper and lower portions of the inner surface of the outer mold member 101 between the upper and lower edge portions 102 and 103 are inclined and converge at the center of the outer mold member 101. An air conduit 106 is connected to a suitable source of air under pressure and to an air fitting 107 which is mounted in a suitable aperture in the outer mold member 101 and positioned at the center thereof. The air fitting 107 is operative to direct a blast of air under pressure into the space between the outer mold member 101 and the heated tubular blank.

In using a molding apparatus constructed as illustrated in FIGS. 11 to 14 inclusive, the sections of the inner mold member 5 are positioned in spaced relation from the outer mold member 101 of the outer jacket 100. A heated tubular form or blank, preferably formed of polyvinyl chloride, is positioned in the space between the outer jacket 100 and the inner mold member 5. Suitable extensible members (not shown) are operated to effect closing movement of the inner mold member 5 which moves upper and lower portions of the tubular blank into sealing engagement with the upper and lower edge portions 102 and 103 respectively of the outer mold member 101 thereby effecting a substantially fluid tight seal between an exterior surface of the tubular blank and an interior surface of the outer mold member 101. A suitable gas under pressure, such as air, is directed under high velocity into the space between the outer mold member 101 and the heated tubular blank to effect flow or movement of respective portions of the blank into the annular recesses 52 and the enlarged central recess 53. Cooling material is introduced into the outer jacket 100 and into the sections 48 to 51 inclusive of the inner mold member 5 in a manner as previously described to effect a set of the heated tubular blank in the form of the molded pipe coupling. The extensible members are then operated to effect retractive movement of the sections 48 to 51 inclusive of the inner mold member 5 away from the molded pipe coupling which then may be removed from the molding apparatus illustrated in FIGS. 11 to 14 inclusive.

FIGS. 15 and 16 illustrate use of the molding apparatus having the cutting means 85 thereon. An elongated tubular blank or pipe 108 has a lower end portion thereof heated within a suitable heating unit 109 while being supported at the other end of a suitable pipe holder 110.

The outer jacket 3 is opened and the inner mold member 5 is moved to the retracted position by operation of the extensible member 8. The cutting blade is aligned with the slide rail 18 and above the first portion 29 of the outer jacket 3. The heated lower end portion of the pipe 108 is positioned within the molding apparatus and the extensible member 8 is operated to close the molding apparatus, as best seen in FIG. 16. The cutting means 85 is operated to sever the molded end portion from the remainder of the pipe 108. The pipe holder 110 is then moved to return the pipe 108 to the heater 109 and the molding apparatus is opened for removal of the molded pipe coupling 2.

It is to be understood that while We have illustrated and described certain forms of our invention, it is not to be limited to these specific forms or arrangement of parts herein described and shown.

What we claim and desire to secure by Letters Patent is:

1. An apparatus for molding a pipe coupling and comprising:
   a. a supporting frame;
   b. an outer jacket mounted on said supporting frame and having an inner surface with opposed edges;
   c. an inner mold member mounted on said supporting frame and having an outer surface with opposed edges and a desired shape, said inner mold member having a plurality of sections arranged in a pair of opposed pairs and movable toward and away from the inner surface of said outer jacket;
   d. said outer surface of said inner mold member has a plurality of annular recesses therein each adapted to receive a respective portion of the tubular pipe portion therein;
   e. said inner surface of said outer jacket has respective means adjacent each of the opposed edges thereof for effecting a substantially fluid tight seal when respective portions of the tubular pipe portion are moved into engagement therewith by the closing movement of said inner mold member;
   f. means mounted on said supporting frame and operatively connected to the sections of at least one pair of said pair of opposed pairs of sections of said inner mold member for selectively effecting opening and closing movements of said sections of said inner mold member, said closing movement being operative to effect molding of a tubular pipe portion positioned between said inner surface of said outer jacket and said outer surface of said inner mold member;
   g. said inner surface of said outer jacket has means communicating therewith for directing fluid under pressure into a space between said inner surface of said outer jacket and the tubular pipe portion to effect forming engagement thereof with the outer surface of said inner mold member and flow of respective portions of the tubular pipe portion into the recesses in said outer surface of said inner mold member.

2. An apparatus for molding a pipe coupling and comprising:
   a. a supporting frame;
   b. an outer jacket mounted on said supporting frame and having an inner surface with opposed edges;
   c. an inner mold member mounted on said supporting frame and having an outer surface with opposed edges and a desired shape, said inner mold member having a plurality of sections arranged in a pair of opposed pairs and movable toward and away from the inner surface of said outer jacket;
   d. means mounted on said supporting frame and operatively connected to the sections of at least one pair of said pair of opposed pairs of sections of said inner mold member for selectively effecting opening and closing movements of said sections of said inner mold member, said closing movement being operative to effect molding of a tubular pipe portion positioned between said inner surface of said outer jacket and said outer surface of said inner mold member;
   e. said means for effecting opening and closing movements of said sections of said inner mold member including:
      1. extensible means having one end thereof connected to said supporting frame;
      2. a slide member having an other end of said extensible means connected thereto;
      3. guide members mounted on said supporting frame and positioned in engagement with said slide member and adapted to define a path of movement of said slide member;
      4. means connecting one of the sections of the one pair of said inner mold member to said slide member and the other section to said guide members; and
      5. resilient means extending between and connected to the sections of the other pair of sections of said inner mold member for urging said sections of said other pair of sections toward each other.

3. An apparatus for molding a pipe coupling as set forth in claim 2 wherein:
   a. each of said sections of said one pair of sections of said inner mold member has a pair of opposite sides intersecting the respective outer surface thereof and diverging therefrom;
   b. each of said sections of said other pair of sections of said inner mold member has a pair of rear surfaces each in sliding engagement with a respective one of the opposite sides of a respective one of the sections of said one pair of sections; and
   c. the rear surfaces of each of said sections of the other pair of sections of said inner mold member extend from the outer surface thereof and converge at the center of said respective sections of the other pair of sections.

4. An apparatus for molding a pipe coupling as set forth in claim 3 wherein:
   a. said outer jacket has wall members defining a chamber therein and surrounding said inner surface of said outer jacket;
   b. said outer jacket has means for communicating a cooling material into said chamber therein; and
   c. said sections of said inner mold member each have means for communicating a cooling material thereinto.

5. An apparatus for molding a pipe coupling as set forth in claim 2 wherein:
   a. said outer jacket has a first portion and a second portion;
   b. one of said first and second portions of said outer jacket is connected to said slide member; and
   c. the other of said first and second portions of said outer jacket is connected to said guide members whereby operation of said extensible means effects relative movement between said first and second portions of said outer jacket.

6. An apparatus for molding a pipe coupling and comprising:
   a. a supporting frame;
   b. an outer jacket mounted on said supporting frame and having an inner surface with a desired shape, said outer jacket having a first portion and a second portion;
   c. an inner mold member mounted on said supporting frame and having an outer surface with a desired shape, said inner mold member having a plurality of sections arranged in a pair of opposed pairs and movable toward and away from the inner surface of said outer jacket;
   d. means mounted on said supporting frame and operatively connected to said first and second portions of said outer jacket and to at least one pair of said pairs of opposed sections of said inner mold member for selectively effecting opening and closing movements of said portions of said outer jacket and said sections of said inner mold member, said closing movement being effective to mold a pipe portion positioned between said inner surface of said outer jacket and said outer surface of said inner mold member;
   e. the sections of the other pair of said pairs of opposed sections of said inner mold member each have resilient means connected thereto for urging said sections toward each other;
   f. said means for effecting opening and closing movements of said portions of said outer jacket and said sections of said inner mold member includes:
      1. extensible means having one end thereof connected to said supporting frame;
      2. a slide member having an other end of said extensible means connected thereto; and
      3. guide members mounted on said supporting frame and positioned in engagement with said slide member and adapted to define a path of movement of said slide member;
   g. one of said first and second portions of said outer jacket is connected to said slide member and the other is connected to said guide members; and
   h. one of the sections of the one pair of opposed pairs of sections of said inner mold member is connected to said slide member and the other is connected to said guide members whereby relative movement between said slide member and said guide members effects relative movement between said first and second portions of said outer jacket and between the sections of the one of the pairs of opposed sections of said inner mold member and thereby relative movement between the sections of the other of the pairs of opposed sections of said inner mold member.

7. An apparatus for molding a pipe coupling and comprising:
   a. a supporting frame;
   b. an outer jacket mounted on said supporting frame and having an inner surface with a desired shape, said outer jacket having a first portion and a second portion;
   c. an inner mold member mounted on said supporting frame and having an outer surface with a desired shape, said inner mold member having a plurality of sections arranged in a pair of opposed pairs and movable toward and away from the inner surface of said outer jacket;
   d. means mounted on said supporting frame and operatively connected to said first and second portions of said outer jacket and to at least one pair of said pairs of opposed sections of said inner mold member for selectively effecting opening and closing movements of said portions of said outer jacket and said sections of said inner mold member, said closing movement being effective to mold a pipe portion positioned between said inner surface of said outer jacket and said outer surface of said inner mold member;
   e. each of said sections of said one pair of sections of said inner mold member has a pair of opposite sides intersecting the respective outer surface thereof and diverging therefrom;
   f. each of said sections of the other pair of sections of said inner mold member has a pair of rear surfaces each in sliding engagement with a respective one of the opposite sides of a respective one of the sections of said one pair of sections;
   g. the rear surfaces of each of said sections of the other pair of sections of said inner mold member extend from the outer surface thereof and converge at the center of said respective sections of the other pair of sections;
   h. the sections of the other pair of said pairs of opposed sections of said inner mold member each have resilient means connected thereto for urging said sections toward each other.

8. An apparatus for molding a pipe coupling as set forth in claim 7 wherein:
   a. said means for effecting opening and closing movements of said portions of said outer jacket and said sections of said inner mold member includes:
      1. extensible means having one end thereof connected to said supporting frame;
      2. a slide member having an other end of said extensible means connected thereto; and
      3. guide members mounted on said supporting frame and positioned in engagement with said slide member and adapted to define a path of movement of said slide member;
   b. one of said first and second portions of said outer jacket is connected to said slide member and the other is connected to said guide members; and
   c. one of the sections of the one of said pairs of opposed sections of said inner mold member is connected to said slide member and the other is connected to said guide members whereby relative movement between said slide member and said guide members effects relative movement between said first and second portions of said outer jacket and between the sections of the one of the pairs of opposed sections of said inner mold member and thereby relative movement between the sections of the other of the pairs of opposed sections of said inner mold member.

9. An apparatus for molding a pipe coupling and comprising:
   a. an outer jacket having an inner surface with opposed edges;
   b. an inner mold member having an outer surface with opposed edges and a desired shape, said inner mold member having a plurality of sections arranged in a pair of opposed pairs and movable toward and away from the surface of said outer jacket;

c. said outer surface of said inner mold member has a plurality of annular recesses therein each adapted to receive a respective portion of the tubular pipe portion therein;

d. said inner surface of said outer jacket has respective means adjacent each of the opposed edges thereof for effecting a substantially fluid tight seal when respective portions of the tubular pipe portion are moved into engagement therewith by the closing movement of said inner mold member;

e. means operatively connected to the sections of at least one pair of said pair of opposed pairs of sections of said inner mold member for selectively effecting opening and closing movements of said sections of said inner mold member, said closing movement being operative to effect molding of a tubular pipe portion positioned between said inner surface of said outer jacket and said outer surface of said inner mold member.

* * * * *